United States Patent
Pieck et al.

(10) Patent No.: US 10,062,459 B2
(45) Date of Patent: Aug. 28, 2018

(54) MATERIAL MADE OF URANIUM, GADOLINIUM AND OXYGEN AND USE THEREOF AS CONSUMABLE NEUTRON POISON

(71) Applicant: COMMISSARIAT A L'ENERGIE ATOMIQUE ET AUX ENERGIES ALTERNATIVES, Paris (FR)

(72) Inventors: Dario Pieck, Aix en Provence (FR); Lionel Desgranges, Pertuis (FR); Pierre Matheron, Manosque (FR); Yves Pontillon, Pierrevert (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 296 days.

(21) Appl. No.: 14/787,986

(22) PCT Filed: Apr. 24, 2014

(86) PCT No.: PCT/IB2014/060971
§ 371 (c)(1),
(2) Date: Oct. 29, 2015

(87) PCT Pub. No.: WO2014/177980
PCT Pub. Date: Nov. 6, 2014

(65) Prior Publication Data
US 2016/0104548 A1    Apr. 14, 2016

(30) Foreign Application Priority Data
Apr. 29, 2013  (FR) ...................................... 13 53910

(51) Int. Cl.
G21C 7/04     (2006.01)
C01G 43/00    (2006.01)
G21C 3/326    (2006.01)

(52) U.S. Cl.
CPC .............. *G21C 7/04* (2013.01); *C01G 43/00* (2013.01); *G21C 3/326* (2013.01); *C01P 2002/76* (2013.01); *C01P 2002/77* (2013.01); *C01P 2004/82* (2013.01); *C01P 2006/88* (2013.01); *Y02E 30/38* (2013.01); *Y02E 30/39* (2013.01)

(58) Field of Classification Search
CPC ...................................................... G21C 7/04
See application file for complete search history.

(56) References Cited

U.S. PATENT DOCUMENTS

| | | | |
|---|---|---|---|
| 4,438,050 A | 3/1984 | Dorr et al. | |
| 4,668,468 A | 5/1987 | Santucci | |
| 2009/0274262 A1 | 11/2009 | Ravenet | |

FOREIGN PATENT DOCUMENTS

| | | |
|---|---|---|
| EP | 0 026 389 A1 | 4/1981 |
| FR | 2 104 136 A5 | 4/1972 |
| FR | 2 536 571 A1 | 5/1984 |
| JP | S47-036634 B | 9/1972 |
| JP | 2009-505047 A | 2/2009 |

OTHER PUBLICATIONS

Tang et al. "Order-to-disorder phase transformation in ion irradiated uranium-bearing delta-phase oxides RE6U1O12 (RE=Y, Gd, Ho, Yb, and Lu)" Journal of Solid State Chemistry, 183, (2010), 844-848.*
Gregg et al. "Crystal chemistry and structures of uranium-doped gadolinium zirconates" Journal of Nuclear Materials, 438, (2013), pp. 144-153; Available online Mar. 13, 2013.*
Jul. 4, 2014 Search Report issued in International Patent Application No. PCT/IB2014/060971.
Jul. 4, 2014 Written Opinion issued in International Patent Application No. PCT/IB2014/060971.
Apr. 2, 2018 Office Action issued in Japanese Application No. 2011-511151.
Beals et al., "Solid Solutions in the System Urania-Rare-Earth Oxides: I, UO2-GdO1,5," Journal of the American Ceramic Society, vol. 48, No. 5, pp. 271-274, May 1965.
Krishnan et al., "Heat Capacity and Thermal Expansion of Uranium-Gadolinium Mixed Oxides," Journal of Nuclear and Radiochemical Science, vol. 10, No. 1, pp. 19-26, 2009.

* cited by examiner

*Primary Examiner* — Peter F Godenschwager
(74) *Attorney, Agent, or Firm* — Oliff PLC (57) ABSTRACT

The present invention relates to a novel material made of uranium, gadolinium and oxygen, having a crystalline phase having cubic crystallographic structure, having an atomic ratio Gd/[Gd+U] of 0.6 to 0.93, the uranium being present in an oxidation state of +IV and/or +V. The invention further relates to the use of such a material as a consumable neutron poison of a fuel element.

21 Claims, 8 Drawing Sheets

MATERIAL MADE OF URANIUM, GADOLINIUM AND OXYGEN AND USE THEREOF AS CONSUMABLE NEUTRON POISON

The present invention relates to a novel material based on uranium, gadolinium and oxygen exhibiting a crystalline phase enriched in gadolinium.

Such a material is particularly advantageous in the context of its use as burnable neutron poison in a nuclear fuel element, for example used in light water nuclear reactors.

As in any type of industry, the production of nuclear electricity has to respond to economic realities. For nuclear power stations without inline reloading of fuel, as is the case with light water nuclear reactors (LWRs), such as, for example, pressurized water reactors (PWRs), reducing the production costs involves lengthening the operating campaigns of the reactor. Thus, the economically damaging effect of shutdowns in order to reload with fuel and of the maintenance time of the power stations may be limited.

The elongation of the duration of operation, in other words the use of long cycles, requires, however, an additional reserve of reactivity of the fuel, that is to say an increase in the enriching of the starting fuel. However, it is imperative to be able to compensate for this increase in the reactivity of the fuel by an excess of negative reactivity at the start of the cycle.

Currently, this increased need for negative reactivity, in particular in pressurized water reactors, is essentially provided by the presence of boron in the form of boric acid, dissolved at variable concentrations in the coolant or moderator of the primary circuit. The boron acts as poison for the neutrons. The homogeneous distribution of the boron in the core exhibits the advantage of not interfering with the power distribution of the nuclear reactor.

On the other hand, the increase in the content of boron dissolved in the primary circuit is capable of causing some problems, in particular in terms of deterioration in the coefficient of reactivity of the moderator, of corrosion and of safety of the plant, as set out in the document FR 2 789 404, and of increase in the production of tritium.

In fact, the dissolved boron is capable of dilating during an increase in temperature, thus inducing a positive contribution to the coefficient of reactivity of the reactor ($\alpha_m$). The amount of dissolved boron thus absolutely has to be maintained below a maximum limit, in order to observe the criterion of a negative coefficient of reactivity of the moderator ($\alpha_m < 0$) under all the conditions of operation of the reactor.

Furthermore, the introduction of additional amounts of boric acid $H_3BO_3$ may bring about problems of direct corrosion but also, as explained in the document FR 2 789 404, of indirect corrosion brought about, for example, by the lithium introduced as pH control agent for compensating for the amount of boric acid.

Moreover, the risk of untimely dilution of the boron is regarded as one of the main initiators of reactivity insertion accident or "RIA" during safety studies on reactors.

Finally, neutron activation reactions on boron constitute the main source of production, in the primary circuit, of tritium ($^{10}B+n \rightarrow ^3H+2^4He$), an undesirable radionuclide element, and thus the aim is to reduce the discharges to the environment for reasons of safety and of radiation protection.

Consequently, for the purpose of reducing the amount of boron necessary for the control of the reactivity, in particular the cycle start, various burnable poisons, other than soluble boron, or used in conjunction with the latter, have been envisaged.

The term "neutron poison" is understood to mean an element having a high power of capturing neutrons and used to compensate, at least in part, for the excess reactivity of fissile environments. Reference is made to "burnable" neutral poison, also known as "temporary neutron-absorbing or -capturing material", to denote a poison which gradually disappears during the operation of the nuclear reactor. These poisons are generally based on gadolinium, erbium, samarium, europium or other isotope which, subsequent to neutron capture, produces an isotope of low effective absorption cross section.

Among burnable poisons, gadolinium in the solid state is the most widely used. Advantageously, as the density of gadolinium varies only very slightly with temperature, it does not bring about a positive contribution to the coefficient of reactivity of the moderator $\alpha_m$. Of the 25 known isotopes of gadolinium (from $^{142}$Gd to $^{164}$Gd), only seven are stable. Among them, the most absorbent are $^{155}$Gd and $^{157}$Gd, these two isotopes representing nearly 100% of the absorption related to natural gadolinium. Subsequent to the neutron capture, the 155 and 157 isotopes of gadolinium are transmuted into 156 and 158 isotopes respectively, these two isotopes being, on the other hand, of very low effective cross sections. This property makes gadolinium a burnable poison of choice.

On the other hand, unlike boron, the concentration of gadolinium in the solid state in the fuel cannot be controlled by an external system. The gadolinium diminishes and disappears with the consumption of the fuel.

To date, gadolinium is generally used in the oxide form, $Gd_2O_3$, mixed in appropriate proportions with uranium oxide $UO_2$, or a mixture of fissile materials, in order to form fuel pellets of a certain number of rods in a nuclear fuel assembly.

Two major forms of inclusion of gadolinium in nuclear ceramics are distinguished: homogeneous inclusions and heterogeneous inclusions.

In the context of homogeneous inclusions, mention may in particular be made of homogeneous pellets consisting of a (U,Gd)$O_2$ solid solution. However, the $Gd_2O_3$ contents of these pellets do not exceed 20% by weight, in order to remain within the domain of the FCC (face-centered cubic) solid solution of the $UO_2$—$Gd_2O_3$ system. By way of example, the document FR 2 536 571 describes the use, in uranium oxide pellets, of gadolinium oxide $Gd_2O_3$ as neutron-absorbing material, in a percentage by weight of less than 12%. The solid solutions of the $UO_2$—$Gd_2O_3$ system show, however, a large decrease in the thermal conductivity with respect to the $UO_2$, which makes it necessary to decrease the generation of power by reducing the enriching in $^{235}$U and consequently increases the penalty with regard to the generation of energy during the fuel cycle.

As regards the forms of heterogeneous inclusions, gadolinium may be distributed in the nuclear fuel pellets in the form of macromasses or also be present therein according to a specific radial distribution.

A distribution of the macromass type of $Gd_2O_3$, as envisaged by Balestrieri [1], exhibits the advantage of a higher thermal conductivity than that obtained with a $UO_2$—$Gd_2O_3$ solid solution mentioned above. However, gadolinium oxide $Gd_2O_3$ is liable to present problems of incompatibility with the $UO_2$ (in particular in terms of anisotropic expansion) and of solubility in water (under typical operating conditions of a pressurized water reactor, for example), which hinders its use in $UO_2$ pellets.

Furthermore, several alternative forms of radial distribution of gadolinium in fuel pellets, in or not in combination with other burnable poisons, have already been provided.

Thus, the document U.S. Pat. No. 4,671,927 describes the use, in pellets for nuclear fuel rods, of a hybrid mixture of $Gd_2O_3$ (from 1 to 20% by weight) and boron carbide particles.

The document U.S. Pat. No. 4,587,087 provides, for its part, nuclear fuel pellets comprising a core of fissile material, for example of uranium oxide, coated with a first layer comprising mainly boron, optionally in combination with other burnable poisons, and with a second layer of hydrophobic material formed mainly of niobium.

The document U.S. Pat. No. 3,122,484 for its part employs a layer of cadmium, gadolinium or samarium at the surface of $UO_2$ plates (MTR type).

Also, the document U.S. Pat. No. 4,668,468 provides for the use, in a few rods of the assembly, of pellets exhibiting radial poisoning according to different alternative distribution forms, so as to minimize the amount of neutron poison necessary for the control of the reactivity. It more particularly describes pellets comprising, either in their internal region or in their external region, a homogeneous mixture of gadolinium and enriched uranium. Likewise, in the document U.S. Pat. No. 4,678,629, pellets are provided which exhibit a cylindrical internal part comprising from 4 to 8% by weight of $Gd_2O_3$ mixed with natural or depleted uranium and an annular external part formed of $UO_2$ enriched in $^{235}U$.

Finally, all the processing alternative forms presented in these documents use $Gd_2O_3$ without chemical combination with $UO_2$ ($Gd_2O_3$ macromasses, for example) or a mixture of $UO_2$ and $Gd_2O_3$ in which the gadolinium oxide $Gd_2O_3$ does not exceed 20% by weight of the mixture.

These inclusion forms become known materials of the U—Gd—O phase diagram: $UO_2$, $(U,Gd)O_2$ solid solutions and $Gd_2O_3$.

There indeed exists another phase listed in the literature [2] [3] of the U—Gd—O system, which phase is enriched in gadolinium. This phase $Gd_6UO_{12}$, better known under the name "Delta" phase, has a crystallographic structure of the rhombohedral type and belongs to the R3 space group (it may also be indexed under a hexagonal structure). Two types of methods for obtaining the $Gd_6UO_{12}$ phase at the laboratory scale are reported in the literature: starting from comilled $UO_2$ and $Gd_2O_3$ powders [2], or starting from $U_3O_8$ [3].

Unfortunately, the Delta phase proves to be unstable under high-temperature sintering conditions typically employed for the preparation of the $UO_2$ pellets. It is thus not possible to envisage its use as burnable poison of nuclear fuel pellets.

Currently, an increase in the enriching of the fuels is envisaged by the main designers/constructors/operators of nuclear reactors, and also the limitation of/reduction in the use of boron. Consequently, in the light of this increase in enriching and of the problems described above of the current techniques for supplying negative reactivity, a need remains to optimize the poisoning of $UO_2$ ceramics of nuclear assemblies with gadolinium, so as to make possible control of the reactivity under normal operating conditions of a nuclear reactor, while reducing, indeed even while suppressing, the use of boron in the reactor.

The present invention is targeted specifically at providing a novel U—O—Gd material exhibiting a crystalline phase enriched in gadolinium and compatible with its use as burnable neutron poison of a nuclear fuel element, for example for pellets.

Thus, the present invention relates, according to a first of its aspects, to a material based on uranium (U), gadolinium (Gd) and oxygen (O) exhibiting a crystalline phase with a crystallographic structure of cubic type, with a Gd/[Gd+U] atomic ratio ranging from 0.6 to 0.93, the uranium being present therein in the +IV and/or +V oxidation state.

Surprisingly, the inventors have discovered that it is possible to access a U—O—Gd material exhibiting a crystalline phase rich in gadolinium and stable under the sintering conditions of a fuel pellet.

As described in detail in the continuation of the text, the inventors have more particularly demonstrated two different crystalline phases, which will be referred to in the continuation of the text as "phase C1" and "phase C2", and also a two-phase domain which is a mixture of these two crystalline phases.

The material according to the invention may advantageously be used as burnable neutron poison of a nuclear fuel element.

In fact, as described in detail in the continuation of the text, it is produced under the same sintering conditions as the uranium oxide; it is cosinterable with $UO_2$, which allows it to be used in nuclear fuel pellets.

Thus, according to another of its aspects, the present invention is targeted at the use of a material as defined above as burnable neutron poison of a nuclear fuel element, for example for a light water or heavy water nuclear reactor.

The material according to the invention may thus be employed in pellets used for nuclear fuel assembly rods or also in nuclear fuels of plate type.

As illustrated in the examples which follow, it proves to be possible, by adjusting the number of rods according to the invention, the proportion of burnable poison according to the invention or the pellets constituting them, and/or the isotopic vector of the gadolinium, to design nuclear fuel assemblies which make it possible to approach the behavior of an "ideal" reactor, in other words to optimally operate the reactor.

In particular, the change in the reactivity of the reactor may be better controlled with the use of pellets in accordance with the invention than with conventional homogeneous pellets composed of a $(U,Gd)O_2$ solid solution.

Furthermore, advantageously, the use of the material according to the invention makes it possible to reduce, indeed even to dispense completely with, the use of other absorbing/neutron poisons. In particular, it makes it possible to reduce, indeed even to completely suppress, the use of boron dissolved in the primary cooling circuit of the reactor and/or dissolved in the moderator. The use of the material according to the invention as burnable neutron poison thus makes it possible to overcome the disadvantages, discussed above, brought about by recourse to large amounts of boron, in particular to reduce the problems of corrosion, of tritium production and of risk of reactivity accident.

Other characteristics, advantages and forms of application of the material according to the invention, will more clearly emerge on reading the detailed description which will follow of the implementation examples of the invention and on examining the appended drawings.

In the continuation of the text, the expressions "between . . . and . . . ", "ranging from . . . to . . . " and "varying from . . . to . . . " are equivalent and are understood to mean that the limits are included, unless otherwise mentioned.

Unless otherwise mentioned, the expression "comprising a(n)" should be understood as "comprising at least one".

Material of the Invention

As mentioned above, the material based on uranium (U), gadolinium (Gd) and oxygen (O) according to the invention is characterized by a crystalline phase with a crystallographic structure of cubic type, with a Gd/[Gd+U] atomic ratio ranging from 0.6 to 0.93, the uranium being present therein in the +IV and/or +V oxidation state.

According to a first alternative embodiment, the material according to the invention exhibits a crystalline phase, subsequently denoted "cubic 1" or "C1" phase, the Gd/[Gd+U] atomic ratio of which is between 0.79 and 0.93.

This C1 phase more particularly exhibits a crystallographic structure of cubic type with a unit cell parameter ($a_1$), close to that of c-$Gd_2O_3$ (unit cell parameter of approximately 10.83 Å), between 10.8 and 10.9 Å.

According to a second alternative embodiment, the material according to the invention exhibits a crystalline phase, subsequently denoted "cubic 2" or "C2" phase, the Gd/[Gd+U] atomic ratio of which is between 0.6 and 0.71.

This C2 phase more particularly exhibits a crystallographic structure of cubic type with a unit cell parameter ($a_2$), close to that of $UO_2$ (unit cell parameter of approximately 5.47 Å), between 5.3 and 5.5 Å.

According to yet another alternative embodiment, the material according to the invention is of two-phase type, exhibiting both a cubic 1 phase and a cubic 2 phase as defined above.

In other words, the material according to this third alternative form exhibits a crystalline phase with an overall Gd/[Gd+U] atomic ratio strictly of greater than 0.71 and strictly of less than 0.79.

The uranium present in a material of the invention, according to one or other of the abovementioned alternative forms, may be natural uranium (mixture of $^{234}U$, $^{235}U$ and $^{238}U$).

According to another specific embodiment, it may be uranium, the natural isotopic composition of which is modified, in particular uranium isotopically enriched in $^{235}U$ or uranium isotopically depleted in $^{235}U$.

Likewise, the gadolinium present in a material according to the invention may be natural gadolinium ($^{152}Gd/^{154}Gd/^{155}Gd/^{156}Gd/^{157}Gd/^{158}Gd/^{160}Gd$ mixture).

According to another specific embodiment, it may be gadolinium, the natural isotopic composition of which is modified in its $^{155}Gd/Gd_{total}$ ratio and/or in its $^{157}Gd/Gd_{total}$ ratio, in particular with an increased $^{155}Gd$ and/or $^{157}Gd$ content in comparison with natural gadolinium.

By way of example, the gadolinium of the material according to the invention may exhibit the following isotopic vectors: 100% $^{155}Gd$; 50% $^{155}Gd$+50% $^{157}Gd$.

As illustrated in the following example 4 and in FIGS. 7.a and 8, it is possible, by varying the isotopic vector of gadolinium, more specifically the $^{155}Gd/Gd_{total}$ and/or $^{157}Gd/Gd_{total}$ isotopic ratios, to obtain controlled kinetics of exhaustion of the gadolinium.

Preparation of the Material According to the Invention

According to another of its aspects, the present invention relates to a process for the preparation of a material as defined above comprising a stage of sintering, at a temperature ranging from 1200 to 2200° C. and under a reducing atmosphere, a powder formed of a mixture of uranium oxide and gadolinium oxide ($Gd_2O_3$) in proportions such that the gadolinium is present in the final powder in a Gd/[Gd+U] atomic ratio ranging from 0.6 to 0.93.

The uranium oxide may more particularly be uranium dioxide ($UO_2$) or a higher oxide, such as $U_3O_8$ (triuranium octaoxide).

According to a specific embodiment, the powder is formed by mixing a first uranium dioxide $UO_2$ powder and a second gadolinium oxide $Gd_2O_3$ powder in a $Gd_2O_3/(UO_2+Gd_2O_3)$ ratio by weight of greater than or equal to 40% by weight.

Of course, it is up to a person skilled in the art to adjust the proportions of uranium oxide and gadolinium oxide employed in order to obtain the desired proportion of gadolinium in the final powder.

The sintering stage may be carried out on the powder, prior to the use thereof in a nuclear fuel element, for example for a pellet.

Alternatively, this sintering stage may be carried out during the preparation of the nuclear fuel element. In particular, in the case of the preparation of a pellet according to the invention, as described in detail in the continuation of the text, the sintering may be carried out on the powder deposited in the form of a slip at the surface of a pellet comprising at least one fissile, indeed even fertile, material (crude pellet pressed simply by compaction, or presintered pellet) by overall sintering of the pellet. The material of the invention is then formed directly on the pellet, on completion of the sintering.

The stage of sintering under a reducing atmosphere may be carried out by any technique known to a person skilled in the art.

It may be carried out by heating the powder at a temperature ranging from 1200 to 2200° C., in particular from 1600 to 1800° C.

"Reducing atmosphere" is understood to mean an atmosphere exhibiting an oxygen potential $pO_2$, of less than −300 kJ/mol, in particular between −550 kJ/mol and −300 kJ/mol, during the sintering.

The reducing atmosphere may more particularly be an atmosphere incorporating hydrogen, for example an argon atmosphere (with potentially a few ppm of $O_2$ impurity) to which 5 mol % of hydrogen has been added.

Generally, the duration of the sintering may be greater than or equal to 1 hour, in particular ranging from 3 to 8 hours.

Applications of the Material as Burnable Poison

As specifically indicated, the material according to the invention finds a particularly advantageous application as burnable neutron poison of a nuclear fuel element.

It may, for example, be used to control the reactivity in the context of the operation of light water nuclear reactors (LWRs), for example for pressurized water reactors or boiling water reactors, or also for heavy water (deuterium oxide $D_2O$) reactors.

Generally, "nuclear reactor" is understood to mean the usual sense of the term to date, namely power stations for the production of energy from nuclear fission reactions using fuel elements in which fission reactions take place which release the calorific power, the latter being extracted from the elements by heat exchange with a heat-exchange fluid which provides for the cooling thereof.

The material may thus be employed in nuclear fuel elements conventionally encountered in nuclear plants of the type consisting of rods formed of a plurality of pellets stacked on one another or also of plate type, as described more specifically in the continuation of the text.

Of course, the invention is in no way limited to the specific alternative embodiments described below.

Nuclear Fuel Pellet

The present invention relates, according to another of its aspects, to a nuclear fuel pellet comprising a material as defined above.

As mentioned above, the pellets denote ceramic fuel elements of cylindrical shape, the stacking of which in a cladding tube forms a rod of a nuclear assembly.

Figure 1:
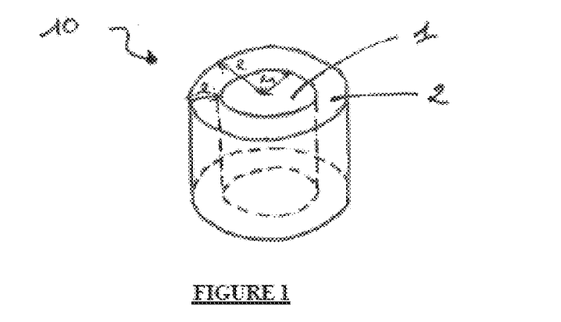
FIG. 1: Diagrammatic representation of a heterogeneous pellet according to a specific form of the invention.

According to a particularly preferred embodiment, a pellet according to the invention is a heterogeneous pellet, as represented in FIG. 1, formed of at least an internal part, in particular cylindrical (1), comprising at least one fissile, indeed even fertile, material and coated with an annular external part (2) formed in all or part of a material according to the invention.

Preferably, the pellet of the invention is of cylindrical form, like the pellets conventionally encountered in nuclear fuel rods. Other forms may, of course, be envisaged, for example an overall elliptical form, as described in the application FR 2 953 637.

A pellet of the invention may exhibit the dimensions of conventional pellets. For example, it may have a radius between 3.8 mm and 4.4 mm (for example: 4.05 to 4.25 mm) and a height between 3 and 20 mm, typically between 12 and 16 mm.

According to a specific embodiment, the annular external part (2) exhibits a thickness (e) ranging from 0.05 to 7.5% of the total radius (R) of said pellet, in particular ranging from 1 to 3.5%.

The annular external part may thus exhibit a thickness (e), measured along the axis of the radius of the pellet, between 2 and 300 µm, in particular between 30 and 250 µm.

Figure 7:
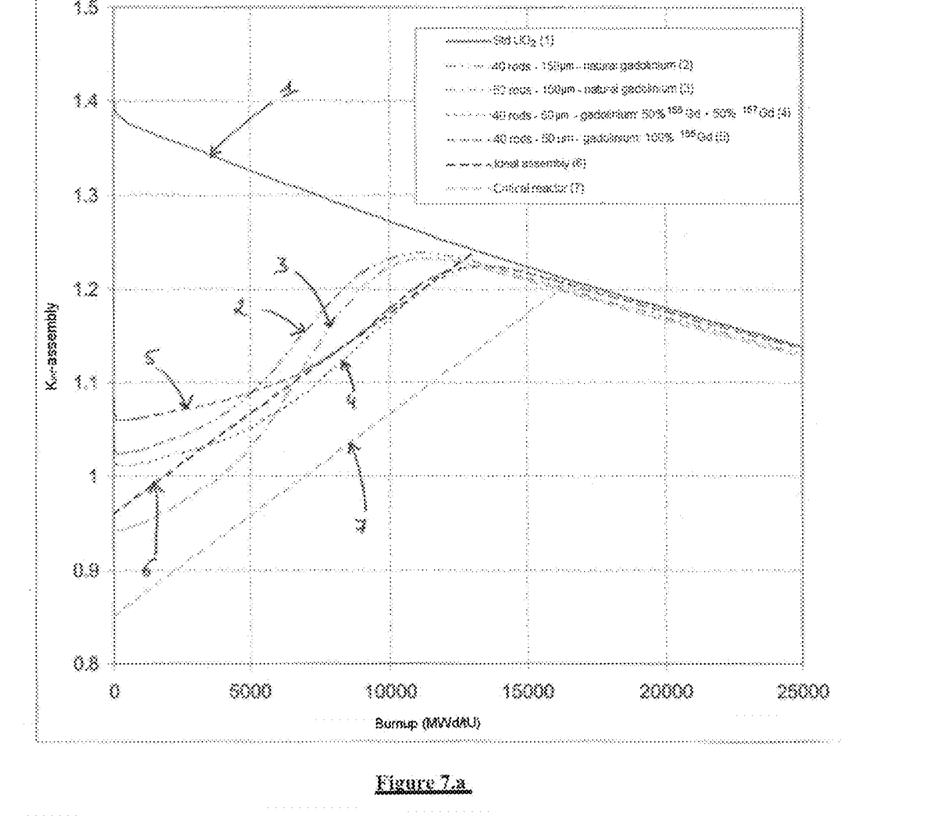
Figure 8:
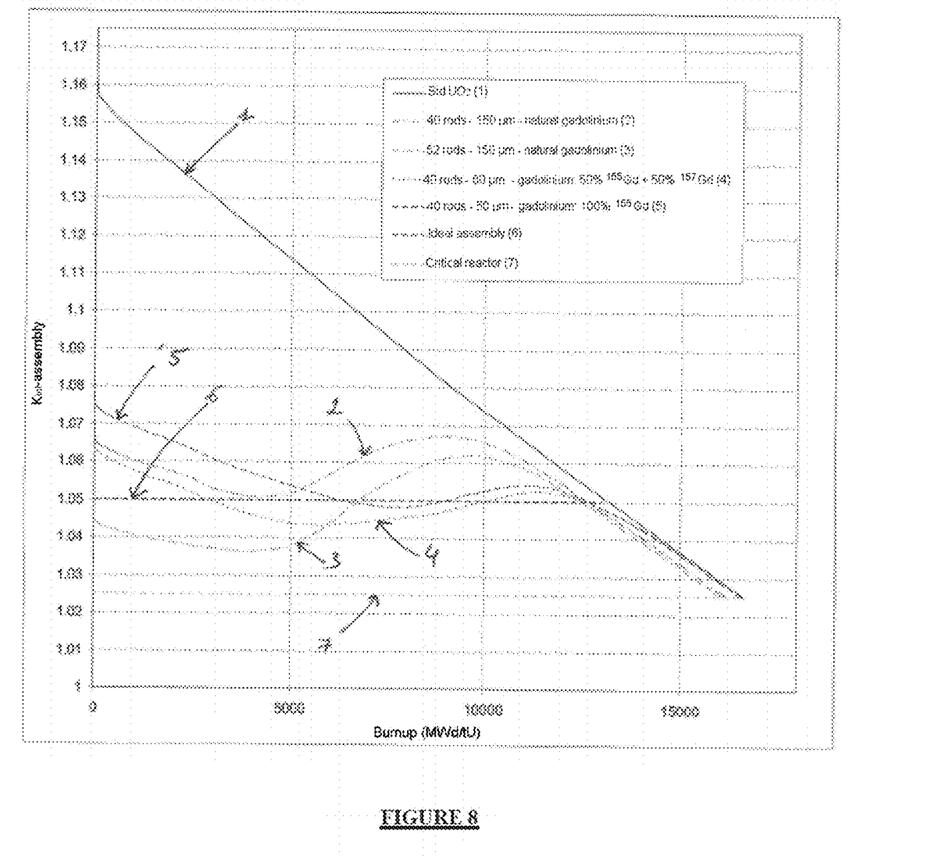
FIG. 8: Change in the infinite multiplication factor of an imaginary reactor employing management by quarter and the assemblies illustrated in FIG. 7.*a* and comparison (modeling using the APOLLO2 computing code)

As illustrated in example 4 and in FIGS. 7.a and 8, the thickness of the annular external part (2) and thus the proportion of burnable neutron poison according to the invention of the pellet may advantageously be adjusted in order to control as best as possible the change in the reactivity of the reactor and to approach an optimum change.

"Fertile" material is understood to mean a material composed of fertile atoms, in other words of atoms, the nucleus of which may be converted, directly or indirectly, into a fissile nucleus by capture of neutrons. A fertile material may, for example, be $^{238}U$.

"Fissile" material is understood to mean a material, the nuclei of which are capable of undergoing fission by absorption of neutrons, such as, for example, $^{235}U$.

The cylindrical internal part (1), also known as "core", of the pellets according to the invention may be formed in all or part of uranium oxide ($UO_2$), plutonium oxide ($PuO_2$), thorium oxide ($ThO_2$) or a mixture of these fissile materials, such as, for example, $(U, Pu)O_2$.

According to a specific embodiment, the core of the pellets is formed of uranium oxide.

Just as described above, the uranium may be natural uranium or uranium, the isotopic vector of which is modified, for example uranium isotopically enriched in $^{235}U$.

Preparation of a Pellet in Accordance with the Invention

According to a first embodiment, a heterogeneous pellet according to the invention may be formed by pressing the powders.

More particularly, a pellet according to the invention may be molded according to the structure represented in FIG. 1, by compression of a first powder comprising at least one fissile material and dedicated to forming the core of the pellet and of a second powder formed in all or part of a material according to the invention and dedicated to forming the annular external part.

The pellet thus molded is subsequently sintered according to techniques known to a person skilled in the art, under reducing conditions, for example under an argon (or nitrogen) atmosphere to which hydrogen has been added.

The sintering is more preferably carried out at a temperature ranging from 1200 to 2200° C., in particular from 1600 to 1800° C.

This embodiment is particularly advantageous for forming pellets with an annular external layer with a thickness, along the axis of radius, of at least 50 µm.

According to another specific embodiment, the annular external part (2) may be formed by deposition of a slip at the surface of a pellet dedicated to forming the core of the final pellet according to the invention.

Thus, according to another of its aspects, the present invention relates to a process for the manufacture of a heterogeneous nuclear fuel pellet (10) according to the invention comprising at least the stages consisting in:

(i) having available a powder comprising a material according to the invention or having available a powder formed of a mixture of uranium oxide such as $UO_2$ or a higher oxide, such as $U_3O_8$, and gadolinium oxide $Gd_2O_3$ in proportions such that the gadolinium is present in a Gd/[Gd+U] atomic ratio ranging from 0.6 to 0.93;

(ii) preparing a slip from the powder of stage (i);

(iii) depositing the powder in the slip form on the surface of a pellet (1) comprising at least one fissile, indeed fertile, material; and (iv) sintering the pellet obtained on conclusion of stage (iii) under reducing atmosphere and at a temperature between 1200° C. and 2200° C.

Thus, a pellet (10) according to the invention may be prepared from a powder of material according to the invention formed prior to the use thereof in stage (i) of the process of the invention.

Alternatively, the material according to the invention may be produced directly on the pellet, during the overall sintering in stage (iv) of the pellet under reducing conditions.

The slip in stage (ii) may be formed conventionally by mixing the powder of stage (i) with a liquid medium capable of being able to be easily removed by heating or natural evaporation, in particular ethanol.

The pellet (1), at the surface of which the slip is deposited and which is dedicated to forming the core of the heterogeneous pellet (10) of the invention, is preferably a pressed pellet. It may be prepared by any conventional method known to a person skilled in the art for the preparation of nuclear fuel pellets.

For example, the pellet (1) may be formed via the following stages:

preparing the fuel powder, for example uranium oxide powder, referred to as pelleting stage;

compacting the fuel powder in the pellet form by cold pressing or any other means, optionally while using a lubricant, such as zinc stearate, ammonium stearate or ethylene bis(stearamide) (composed of 76.8% C+13.3% H+5.1% O+4.8% N, sold by Hoechst under the name Ceridust).

The pellet (1) may be nonsintered, sintered or presintered.

The sintering may more particularly be carried out by heating the pressed pellet at high temperature, in particular at a temperature of greater than 1200° C., in particular under reducing atmosphere.

"Presintered" pellet is understood to mean a pellet which has been subjected to a heat treatment below the sintering conditions, for example at a temperature ranging from 1000 to 1500° C., in particular of approximately 1200° C., especially under reducing atmosphere. The presintering advantageously makes it possible to improve the cohesion of the pellet, without achieving complete densification.

The slip obtained on conclusion of stage (ii) may be deposited at the surface of the core pellet (1) by immersing the pellet in the slip.

Stage (iii) may include the drying of the layer of slip deposited at the surface of the pellet, for example by leaving the pellet, at the surface of which the slip is deposited, in the open air for a period of time ranging from 5 to 30 minutes and optionally by heating between 40 and 90° C., typically between 50 and 60° C.

The sintering in stage (iv) may be carried out under an argon atmosphere to which hydrogen has been added, for example under an argon atmosphere to which 5 mol % of hydrogen has been added.

Preferably, this sintering stage is carried out at a temperature ranging from 1200° C. to 2200° C., in particular from 1600 to 1800° C.

According to a specific embodiment, this sintering stage is carried out for a period of time of greater than or equal to 1 hour, in particular ranging from 3 to 8 hours.

Nuclear Fuel Rod and Assembly

The pellets according to the invention, as described above, may be employed in nuclear fuel rods.

"Nuclear fuel rod" is intended to denote, conventionally, a tubular fuel element, having a small diameter, closed at its two ends, constituent of the core of a nuclear reactor and comprising a fissile or fertile material.

A rod is more particularly formed of a plurality of fuel pellets stacked on one another and of a cladding surrounding the stack of pellets. For example, the cladding of a rod provided for a pressurized water reactor (PWR) may be made of zirconium alloy or of M5 (ZrNbO) alloy. Several rods form an assembly and several assemblies form the core of a nuclear reactor.

The invention thus relates, according to another of its aspects, to a nuclear fuel rod comprising fuel pellets as defined above.

A rod according to the invention may be composed exclusively of identical or different pellets in accordance with the invention.

According to another specific embodiment, it may comprise, in addition to the pellets in accordance with the invention, other pellets not comprising the material of the invention as poison, for example homogeneous $UO_2$ pellets.

The invention also relates to a nuclear fuel assembly, for example used for a light water reactor, comprising fuel rods according to the invention as defined above.

The number and the positioning of the rods according to the invention in a conventional assembly formed of a lattice of rods may be adjusted so as to result in optimum control of the reactor, as illustrated in example 4 which follows and in FIGS. 7.a and 8.

Preferably, the rods enriched in gadolinium according to the invention are distributed uniformly in the fuel assembly. An appropriate distribution of the fuel assemblies comprising gadolinium according to the invention in the core of the nuclear reactor makes it possible to achieve a more uniform radial distribution of the power, this being the case throughout an operating cycle of the core before reloading.

By way of example, a conventional assembly formed of a 17×17 lattice may incorporate from 4 to 64 rods according to the invention, it being possible for the other rods to be formed of conventional pellets not comprising poison, for example homogeneous $UO_2$ pellets enriched in $^{235}U$.

Figure 3:
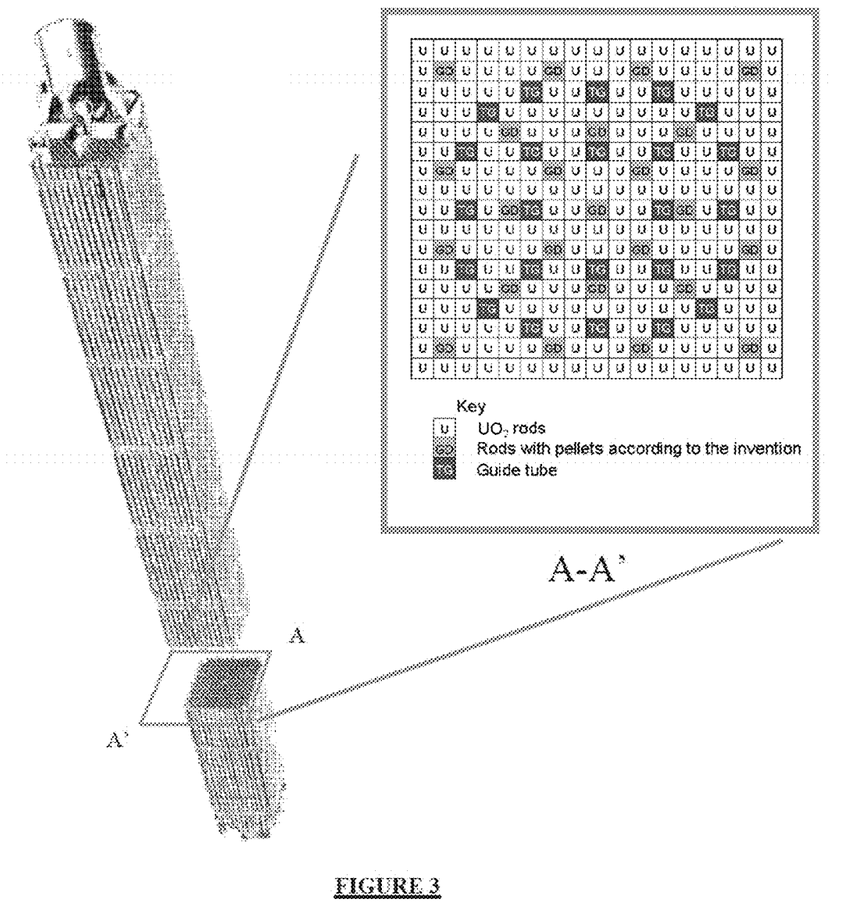
FIG. 3: Diagrammatic representation of a section of an assembly modeled as 17×17 rods, incorporating 52 rods (denoted "GD") formed of pellets in accordance with the invention, the rods denoted "U" being composed of homogeneous $UO_2$ pellets enriched to 4.9% $^{235}U$, and "TG" denoting guide tubes. The left-hand image is simply an illustrative example of such an assembly.

FIG. 3 diagrammatically represents, by way of example, a fuel assembly formed of a 17×17 lattice, composed of 265 fuel rods, including 25 rods (GD) formed of pellets according to the invention, the other rods (U) being formed of homogeneous $UO_2$ pellets. The fuel rods are held by a structure comprising 24 guide tubes (TG).

Of course, the material according to the invention may be employed as burnable neutron poison in nuclear fuel elements other than rods.

The exposition which follows describes, by way of example, the use of the material of the invention in nuclear fuels of plate-type geometry.

Nuclear Fuel of Plate-Type Geometry

According to yet another alternative embodiment, the invention relates to a nuclear fuel element of plate-type geometry comprising one or more fissile, indeed even fertile, regions covered, at least in part, with a material according to the invention.

These nuclear fuels of plate-type geometry are generally employed in low-power reactors.

Figure 9:
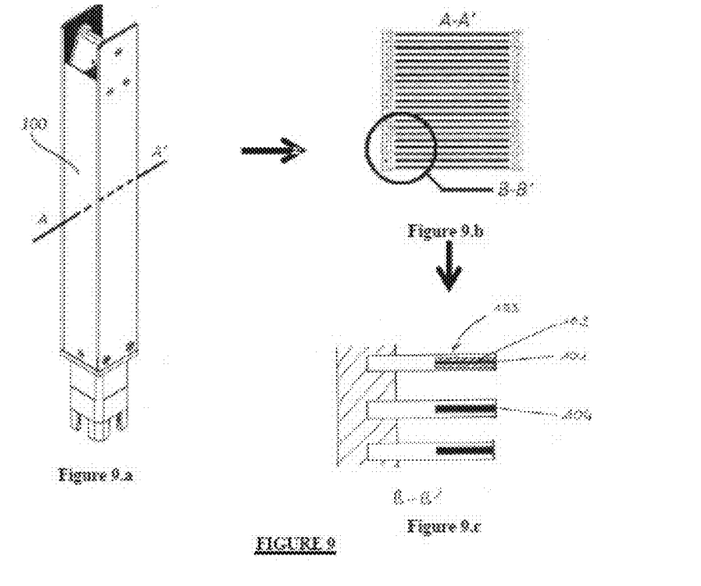
FIG. 9: Diagrammatic representation of the fuel assembly of plate type (FIG. 9.*a*), and views along different cross sections (FIGS. 9.*b* and 9.*c*), it being possible for the plates to be slightly curved and the number of plates being only an example.

FIG. 9.a diagrammatically represents a comprehensive view of such a nuclear fuel assembly (100) comprising a stack of clad plates (FIG. 9.b) comprising a fissile material. The cladding is generally composed of an aluminum alloy.

As represented in FIG. 9.c, the assembly may comprise one or more plates (103) comprising a fissile region (101), for example of $UO_2$, covered at least in part with a layer (102) of material enriched in gadolinium according to the invention. The other plates (104) may be standard plates not comprising poison.

Figure 10:
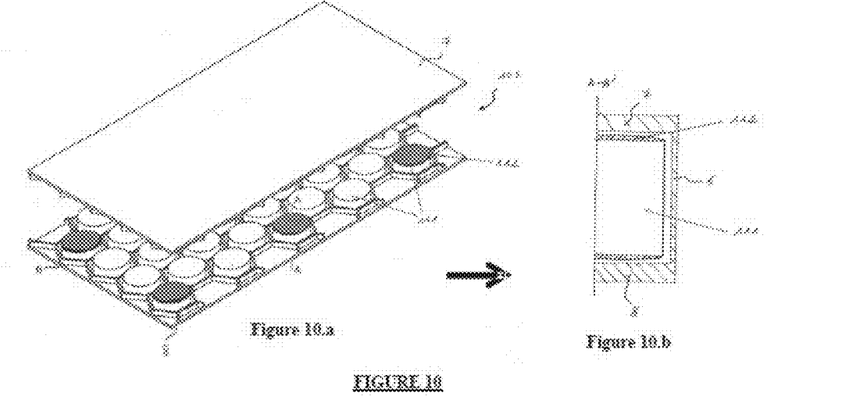
FIG. 10: Diagrammatic representation of a nuclear fuel element of plate type (FIG. 10.*a*), and view in cross section (FIG. 10.*b*).

According to a specific embodiment, as represented in FIG. 10.a, a plate (103) may more particularly be composed of a lattice of nuclear fuel pellets (111) for example of $UO_2$ pellets, located in a lattice of cells (6), inserted between two plates (7,8). Such a fuel element structure of plate type is described in more detail in the document FR 2 889 765.

In the context of this alternative embodiment, a few pellets, indeed even all of the pellets (111) incorporated in the fuel element of plate type may be covered, at least in part, with a layer (112) formed of a material according to the invention, as displayed, in cutaway view, in FIG. 10.b.

The invention will now be described by means of the following examples and figures, given by way of illustration and without any limitation of the invention.

FIGURES

For the purposes of clarity, the various elements in FIG. 1 are not drawn to scale, the true dimensions of the different parts not being observed.

FIG. 7: Change in the multiplication factor $K_{inf}$ of imaginary assemblies as a function of the mean burnup (modeling using the APOLLO2 computing code) for:

FIG. 7.*a*: different assemblies employing 40 or 52 rods formed of heterogeneous pellets in accordance with the invention, the annular coating of which exhibits a thickness of 50, 60 or 150 μm and different Gd isotropic vectors; and FIG. 7.*b*: different assemblies employing from 8 to 40 rods formed of homogeneous pellets composed of a $Gd_2O_3$ and $UO_2$ solid solution comprising 8% by weight of $Gd_2O_3$;

EXAMPLES

Example 1

Preparation of a Material According to the Invention

Different mixed powders formed of a mixture of $UO_2$ and $Gd_2O_3$ with a content by weight of $Gd_2O_3$ varying from 50% to 90% (for example: 55%, 65%, 69%, 80%, 82.4%) are compacted and then sintered under a reducing atmosphere of Ar, 5% $H_2$, at 1700° C. for 4 hours, in order to give dense pellets.

The results of the analyses, by X-ray diffraction, SEM and energy dispersive analysis (EDS), of the pellets thus obtained are presented in table 1 below.

Crystalline phases with a crystallographic structure of cubic type are detected in the pellets thus obtained and more particularly:

- a crystallographic structure of cubic type with a unit cell parameter of approximately 5.43 Å, entitled cubic 2 (C2) phase, for a Gd/[Gd+U] atomic ratio between 0.5 and 0.71;
- a crystallographic structure of cubic type with a unit cell parameter of approximately 10.8 Å, entitled cubic 1 (C1) phase, for a Gd/[Gd+U] atomic ratio between 0.79 and 0.93; and
- a region of phase separation of these two phases for a Gd/[Gd+U] atomic ratio between 0.71 and 0.79.

TABLE 1

| Powders | 1 | 2 | 3 | 4 | 5 |
|---|---|---|---|---|---|
| Content by weight (%) of the starting power $Gd_2O_3/(Gd_2O_3 + UO_2)$ | 55 | 65 | 69 | 80 | 82.4 |
| Z (Gd/(Gd + U)) atomic ratio of the starting powder | 0.66 | 0.74 | 0.75 | 0.85 | 0.87 |
| Crystallographic structure | cubic C2 | cubic C2 and C1 two-phase | cubic C2 and C1 two-phase | cubic C1 | cubic C1 |
| Unit cell parameter (Å) [1] | ~5.43 | mixed | mixed | ~10.86 | ~10.85 |
| Oxidation state of the uranium | +4/+5 | +4/+5 | +4/+5 | +4/+5 | +4/+5 |
| State | solid | solid | solid | solid | solid |

[1] obtained by X-ray diffraction analysis

Example 2

Preparation of a Fuel Pellet According to the Invention by Pressing Powders (i) Powder of Material According to the Invention A powder of material according to the invention is prepared, as described in example 1, by sintering a mixture of $UO_2$ and $Gd_2O_3$, in a $Gd_2O_3/(UO_2+Gd_2O_3)$ ratio by weight of 80%, at 1700° C. and under a reducing atmosphere of Ar, 5% $H_2$, for 4 hours.

(ii) Preparation of the Heterogeneous Pellet

A pellet is molded according to the structure presented in FIG. 1 with a cylindrical internal part formed from a uranium oxide powder and an annular external part formed from the powder enriched in Gd obtained above. In order to distribute the powders according to FIG. 1, it is possible to use a thin partition made with two concentric rings. On completion of the filling, the thin partition is withdrawn and the pressing is carried out.

The cylindrical core exhibits a radius ($R_1$) of approximately 4 mm; the annular external part exhibits a thickness (e) of approximately 50 to 250 μm as a function of the supply of negative reactivity desired.

The pellet is subsequently sintered under reducing conditions with an atmosphere of Ar, 5% $H_2$, for 4 hours.

Example 3

Preparation of a Fuel Pellet According to the Invention by Deposition of a Layer Formed of a Powder Having a High Content of Gd (i) Powder of Material Two possibilities are selected:

A—A powder of material according to the invention is prepared, as described in example 1, by sintering a mixture of $UO_2$ (indeed even of $U_3O_8$) and $Gd_2O_3$ in a $Gd_2O_3/(UO_2+Gd_2O_3)$ ratio by weight of 80%.

B—A powder is prepared by mixing $UO_2$ (indeed even $U_3O_8$) and $Gd_2O_3$ in a $Gd_2O_3/(UO_2+Gd_2O_3)$ ratio by weight of 80%.

(ii) Preparation of the Heterogeneous Pellet

A pellet composed of fissile materials (1) is shaped by compaction with a cylindrical geometry.

In order to give cohesion of the powder, presintering of this pellet may be carried out.

An annular external part formed from the powder enriched in gadolinium, obtained in stage (i) according to mode A or mode B, is deposited, for example in the form of a slip (formed from the powder and ethanol), on the cylindrical surface and then the slip is dried.

The pellet is subsequently sintered under reducing conditions with an atmosphere of Ar, 5% (molar) $H_2$, for 4 hours.

The cylindrical core, with fissile/fertile elements, exhibits a radius of approximately 4 mm; the annular external part, with the gadolinium, exhibits a thickness of approximately 30 to 250 μm as a function of the supply of negative reactivity desired.

Figure 2:
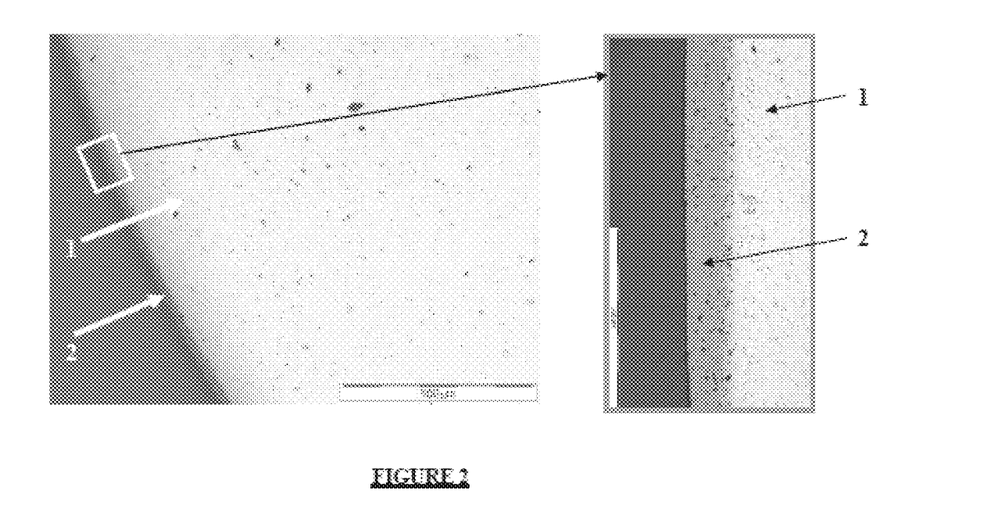
FIG. 2: Photographs obtained with an optical microscope of the observation in cross section of a heterogeneous pellet exhibiting a fissile core (1) of $UO_2$ coated with a peripheral layer (2) rich in gadolinium of phase C1, obtained according to example 4.

FIG. 2 shows the pellet observed in cross section by optical microscopy.

Example 4

Use of a Material According to the Invention as Burnable Poison in Nuclear Reactors for the Supply of Negative Reactivity and/or for the Reduction/Suppression of the Requirements for Boron and Other Neutron Poisons/Absorbing Materials The neutron performance of different 17×17 assemblies of nuclear fuel is modeled using the APOLLO2 computing code.

i. Principles and Definitions of the Notions Used $K_{infini}$: multiplication factor of the neutrons in an infinite medium (without taking into account the escapes);

$K_{true}$: multiplication factor of the neutrons in a finite (true) medium.

The difference between $K_{infini}$ and $K_{true}$ is thus related to the amount of neutrons which escape from the reactor, without multiplying, in other words:

$$K_{infini} = K_{true} \times \text{factor}_{geometric} \quad \text{(Eq. 1)}$$

the $\text{factor}_{geometric}$ depending mainly on the geometry of the core but also on the nature of the materials.

The reactivity ρ, expressed in pcm (percent mille), is another way of expressing the multiplication factor (infinite or true) mathematically, $$\rho = \frac{K-1}{K} \times 1 \cdot 10^5 \quad \text{(Eq. 2)}$$

Thus, equation 1 may be expressed as:

$$\rho_{inf} = \rho_{true} + \rho_{escapes} \quad \text{(Eq. 3)}$$

Critical Reactor

A "critical" reactor is a reactor in which the population of neutrons is constant and different from zero (without taking into account external sources), in other words a reactor for which $K_{true}=1.00$, or, expressed in terms of reactivity, by employing equation 2, ρ=0 pcm.

The calculations carried out with the abovementioned computing code give us the $K_{infini}$. It is found that, for the imaginary reactor, the term $\rho_{escapes}$ is approximately −2500 pcm.

Thus, a "critical" reactor within the meaning of the modelings carried out exhibits: $\rho_{true}=0$ pcm and $\rho_{infini}=2500$ pcm; which is reflected, in multiplication factor, by: $K_{true}=1.00$ and $K_{infini}=1.025$ (curve 7 in FIG. 4).

Figure 4:
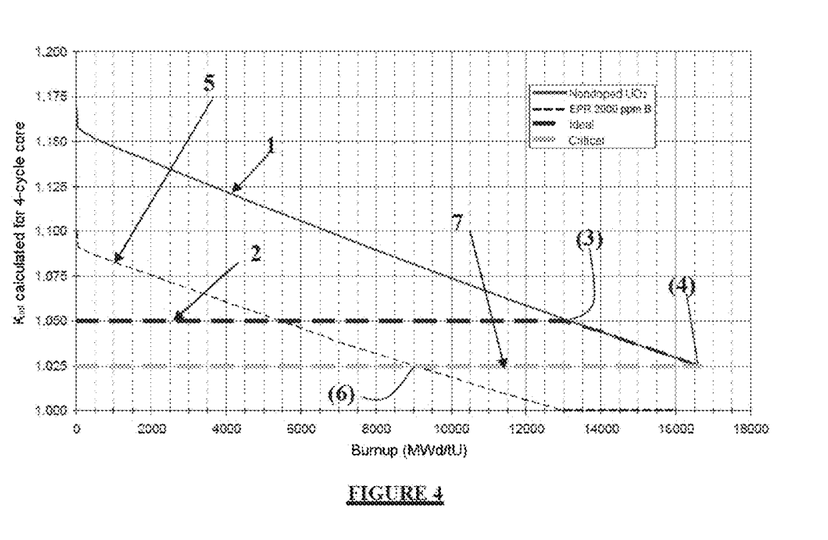
FIG. 4: Change in the infinite multiplication factor ($K_{inf}$) of a reactor as a function of the mean burnup (modeling using the APOLLO2 computing code), for:
- an imaginary reactor with an assembly composed of homogeneous $UO_2$ pellets enriched in $^{235}U$ to 4.9% (curve 1);
- a "critical" reactor as defined in example 4.i, for which $K_{true}=1.00$ (curve 7);
- an "ideal" reactor as defined in example 4.i, for which the true reactivity, $\rho_{true}$, is +2000 pcm (curve 2), until the end of the cycle is reached (between the operating points (3) and (4));
- an imaginary reactor with an assembly composed of homogeneous $UO_2$ pellets enriched in $^{235}U$ to 4.9% and taking into account the effect of a concentration of 2000 pcm of dissolved boron in the heat-exchange fluid (curve 5).

By way of example, FIG. 4 represents the change in the multiplication factor ($K_{infini}$) of an imaginary reactor for an assembly composed of homogeneous $UO_2$ pellets enriched in $^{235}U$ to 4.9%, with management by ¼ (4 operating cycles, in other words, in each cycle, a quarter of the assemblies [the ones most used] are exchanged for fresh assemblies), modeled using the computing code (curve 1).

It is compared with the reactivity of the same reactor using boron (curve 5) as neutron poison (2000 ppm of boron diluted in the water of the heat-exchange fluid). In the case of the use of boron, the reactor may remain critical starting from the operating point (6) by decreasing the concentration of boron in the heat-exchange fluid ("critical boron" operating method).

Multiplication Factor of an Ideal Reactor

Curve 2 on the graph of FIG. 4 represents the change in the infinite multiplication factor of an "ideal" reactor. This "ideal" core is a reactor without a neutron penalty, with an initial superreactivity of 2000 pcm (thus with a $K_{infini}=1.050$) and without penalty over the length of the cycle (operating point (4)).

Thus, as represented in FIG. 4, an "ideal" reactor within the meaning of the modelings carried out is a reactor which has a true reactivity, $\rho_{true}$ of +2000 pcm up to the operating point (3). This superreactivity makes it possible to operate the reactor (for example in order to rise in power).

Multiplication Factor of an Ideal Assembly

Figure 5:
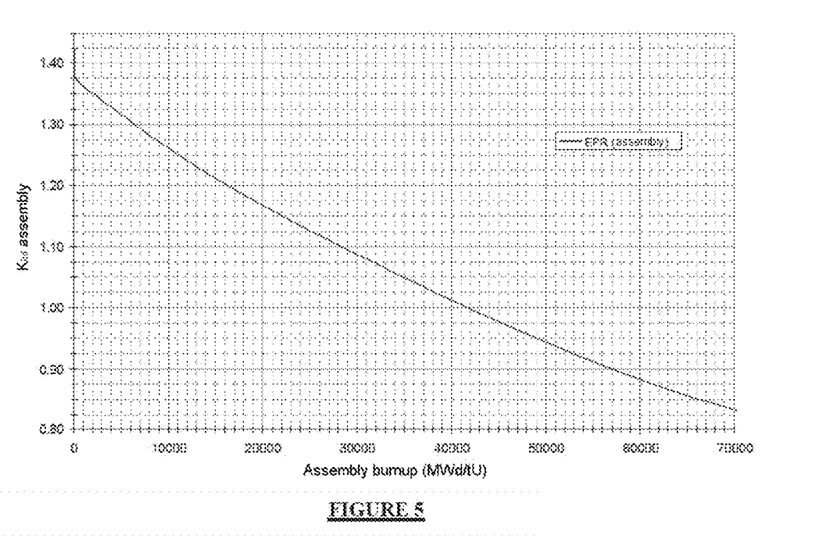
FIG. 5: Change in the multiplication factor $K_{inf}$ of an imaginary 17×17 assembly as a function of the mean burnup for an assembly composed of homogeneous $UO_2$ pellets enriched in $^{235}U$ to 4.9% (modeling using the APOLLO2 computing code)

FIG. 5 exhibits the change in the multiplication factor in an infinite medium $K_{infini}$ under hot conditions (that is to say, while considering the effect of the temperature) of an imaginary fuel assembly based on $UO_2$ as a function of the mean burnup of the assembly, for 17×17 assemblies.

The relationship between the change in the $K_{infini}$ of an assembly ($K_{assembly}^{inf}$) and the change in the $K_{infini}$ of a reactor ($K_{core}^{inf}$), with management of N cycles, is given by the approximation below:

$$K_{core}^{inf}(x) = \frac{1}{N} \sum_{i=0}^{i=N-1} \left[ K_{assembly}^{inf}(x + L_{cycle} \times i) \right] \quad \text{(Eq. 4)}$$

with:

x the burnup of the assemblies in the $1^{st}$ cycle,

N the total number of cycles that the assemblies are used in the reactor, $K_{core}^{inf}(x)$ the $K_{infini}$ of a reactor, with management at N cycles, as a function of the burnup x, $K_{assembly}^{inf}(x+L_{cycle} \times i)$ the $K_{infini}$ of an assembly, as a function of a burnup, $L_{cycle}$ the length of a cycle (in burnup units). In particular, $L_{cycle}$ confirms that $K_{core}^{inf}(L_{cycle})=1.025$, in order for the reactor to be critical at the end of the cycle.

Figure 6:
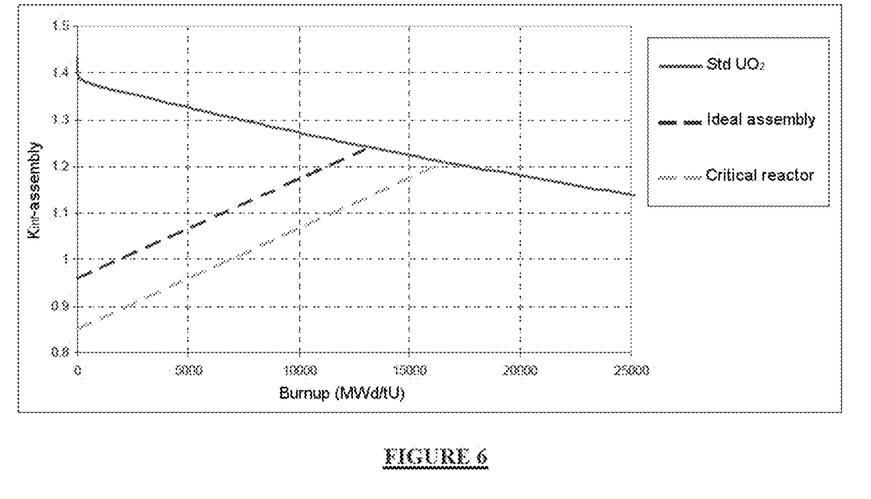
FIG. 6: Change in the multiplication factor $K_{inf}$ of a standard $UO_2$ assembly comprising 4.9% of $U^{235}$, of an "ideal" assembly and of a "critical" assembly as defined in example 4.

By employing equation 4, it is possible to plot (FIG. 6) the change in the $K_{infini}$ of an "ideal" assembly and of a "critical" assembly, so that, employed in a reactor (with management by quarter, thus N=4), they respectively give an "ideal reactor" behavior and "critical reactor" behavior, as defined above.

ii. Neutron Effect Obtained with Different Assemblies

The change in the $K_{infini}$ for various 17×17 assemblies are presented in FIG. 7.a:
- imaginary fuel assembly based on $UO_2$ (curve 1);
- assemblies employing 40 or 52 rods formed of heterogeneous pellets in accordance with the invention, the annular coating of which exhibits a thickness of 50, 60 or 150 µm and various Gd isotopic vectors. The other rods of the assembly are formed of homogeneous $UO_2$ pellets enriched in $^{235}U$ to 4.9% (curves 2 to 5); and
- "ideal" and "critical" assemblies as defined in the preceding point i. (curves 6 and 7).

All these curves consider a boron-free imaginary reactor, that is to say a concentration of 0.0 ppm of boron in the heat-exchange fluid/moderator.

For comparative purposes, the neutron effect obtained for assemblies incorporating rods of conventional homogeneous pellets composed of a $(U,Gd)O_2$ solid solution comprising 8% by weight of $Gd_2O_3$ is presented in FIG. 7.b.

It emerges from FIG. 7.a that it is possible, by adjusting the number of rods in accordance with the invention, the thickness of the burnable poison layer of the pellets constituting them and the isotopic vector of the gadolinium, to control the change in the reactivity of the reactor so as to approach an optimum change.

Also, the comparison of FIGS. 7.a and 7.b shows that the change in the reactivity of the assembly may be better controlled with pellets in accordance with the invention than with conventional homogeneous pellets, since the curve of reactivity for an assembly according to the invention more closely approaches the "ideal" curve at the cycle end.

iii. Reactivity of the Reactor

The behavior of a reactor employing the assemblies of the invention is shown in FIG. 8.

It emerges from FIG. 8 that the effect on the reactivity makes it possible to reduce, indeed even to suppress, the use of boron in the reactor.

REFERENCES

[1] Balestrieri thesis, 1995;
[2] Tang and al., Order-to-disorder phase transformation in ion irradiated uranium-bearing delta-phase oxides $RE_6U_1O_{12}$ (RE=Y, Gd, Ho, Yb, and Lu), *Journal of Solid State Chemistry*, 183(4), 844-848;
[3] Tang and al., Microstructural evolution in irradiated uranium-bearing delta-phase oxides $A_6U_1O_{12}$ (A=Y, Gd, Ho, Yb, and Lu), *Journal of Nuclear Materials*, 407(1), 44-47.

The invention claimed is:

1. A material consisting of uranium (U), gadolinium (Gd) and oxygen (O) exhibiting a crystalline phase with a crystallographic structure of cubic type, with a Gd/[Gd+U] atomic ratio between 0.6 and 0.93, the uranium being present therein in the +IV and/or +V oxidation state.

2. The material as claimed in claim 1, exhibiting a crystalline phase referred to as cubic 1 phase, the Gd/[Gd+U] atomic ratio of which is between 0.79 and 0.93.

3. The material as claimed in claim 2, in which the crystallographic structure of cubic type exhibits a unit cell parameter between 10.8 and 10.9 Å.

4. The material as claimed in claim 1, exhibiting a crystalline phase referred to as cubic 2 phase, the Gd/[Gd+U] atomic ratio of which is between 0.6 and 0.71.

5. The material as claimed in claim 4, in which the crystallographic structure of cubic type exhibits a unit cell parameter between 5.3 and 5.5 Å.

6. The material as claimed in claim 1 of two-phase type, exhibiting (i) a cubic 1 phase, the Gd/[Gd+U] atomic ratio of which is between 0.79 and 0.93, and (ii) a cubic 2 phase, the Gd/[Gd+U] atomic ratio of which is between 0.6 and 0.71.

7. The material as claimed in claim 1, in which the uranium is uranium isotopically enriched in $^{235}U$, uranium isotopically depleted in $^{235}U$ or natural uranium.

8. The material as claimed in claim 1, in which the gadolinium is natural gadolinium or gadolinium isotopically modified in its $^{155}Gd/Gd_{total}$ and/or $^{157}Gd/Gd_{total}$ ratio.

9. A process for the preparation of a material defined according to claim 1, comprising a stage of sintering, at a temperature ranging from 1200 to 2200° C. and under a reducing atmosphere, a powder formed of a mixture of uranium oxide and gadolinium oxide $Gd_2O_3$ in proportions such that the gadolinium is present in a Gd/[Gd+U] atomic ratio ranging from 0.6 to 0.93.

10. The process as claimed in claim 9, in which the sintering is carried out under an argon atmosphere to which 5 mol % of hydrogen has been added.

11. The process as claimed in claim 9, in which the sintering is carried out for a period of time of greater than or equal to 1 hour.

12. A burnable neutron poison of a nuclear fuel element, which comprises the material as claimed in claim 1.

13. A nuclear fuel pellet, comprising a material as defined according to claim 1.

14. A nuclear fuel rod comprising at least one fuel pellet as defined according to claim 13.

15. A nuclear fuel assembly comprising at least one fuel rod as defined in claim 14.

16. A heterogeneous nuclear fuel pellet formed of at least an internal part comprising at least one fissile material, the internal part being coated with an annular external part that is formed in whole or part of a material as defined according to claim 1.

17. The pellet as claimed in claim 16, in which said annular external part exhibits a thickness ranging from 0.05 to 7.5% of the radius of said pellet.

18. The pellet as claimed in claim 16, in which said internal part is formed in whole or part of uranium oxide, plutonium oxide, thorium oxide or their mixtures.

19. A process for manufacturing a heterogeneous nuclear fuel pellet defined according to claim 16, comprising at least the following steps:
  (i) providing a powder comprising a material based on uranium (U), gadolinium (Gd) and oxygen (O) exhibiting a crystalline phase with a crystallographic structure of cubic type, with a Gd/[Gd+U] atomic ratio between 0.6 and 0.93, the uranium being present therein in the +IV and/or +V oxidation state;
  or providing a powder formed of a mixture of uranium oxide and gadolinium oxide $Gd_2O_3$ in proportions such that the gadolinium is present in a Gd/[Gd+U] atomic ratio ranging from 0.6 to 0.93;
  (ii) preparing a slip from the powder of stage (i);
  (iii) depositing the powder in the slip form on the surface of a pellet comprising at least one fissile material; and
  (iv) sintering the pellet obtained on conclusion of stage (iii) under a reducing atmosphere and at a temperature between 1200° C. and 2200° C.

20. The process as claimed in claim 19, in which stage (iii) includes the drying of the slip layer deposited at the surface of the pellet.

21. A nuclear fuel element of plate-type geometry comprising one or more fissile regions covered, at least in part, with a material as defined according to claim 1.

* * * * *